Jan. 13, 1925.
E. COMEAU
LOCK
Filed Sept. 10, 1923
1,523,174
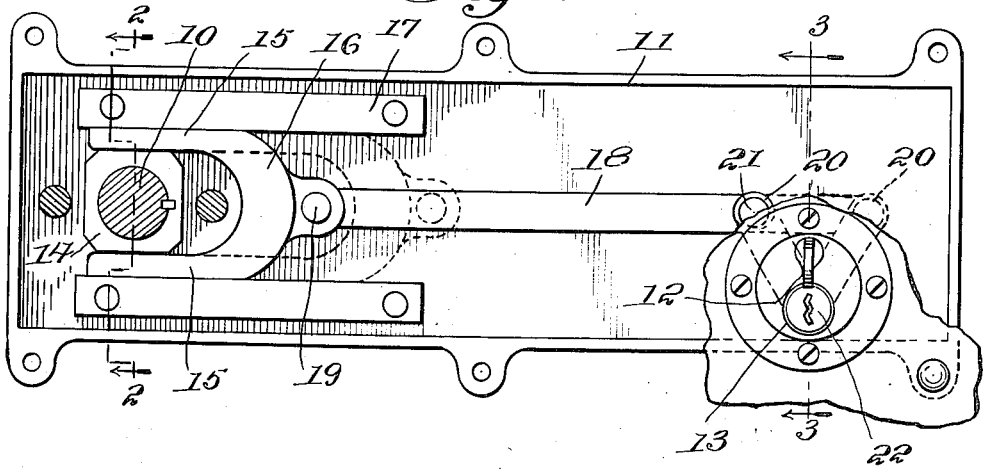
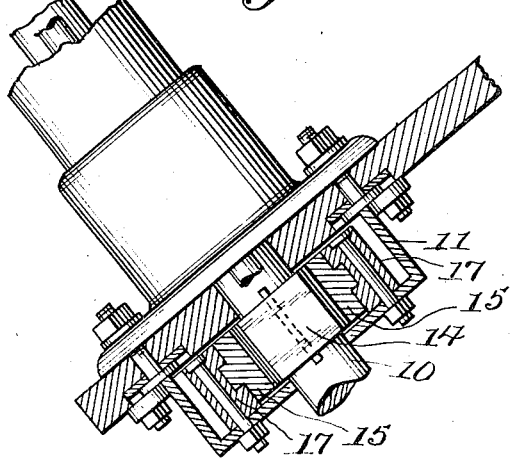
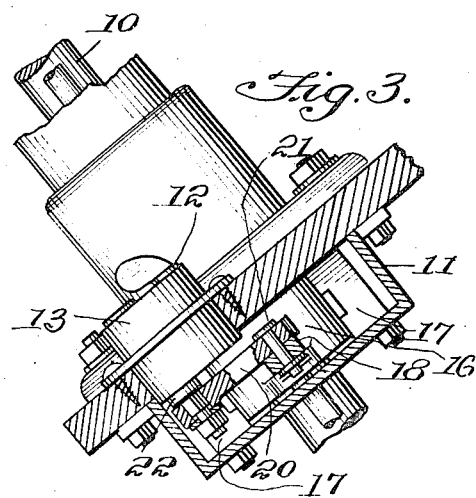
Emile Comeau
INVENTOR
WITNESS:
BY
ATTORNEY Patented Jan. 13, 1925.

1,523,174

UNITED STATES PATENT OFFICE.

EMILE COMEAU, OF LYNN, MASSACHUSETTS.

LOCK.

Application filed September 10, 1923. Serial No. 661,955.

*To all whom it may concern:*

Be it known that I, EMILE COMEAU, a citizen of Canada, residing at Lynn, in the county of Essex and State of Massachusetts, have invented new and useful Improvements in Locks, of which the following is a specification.

This invention relates to locks and more particularly for locks in connection with motor vehicles.

The principal object of the invention is the provision of a locking device wherein the steering wheel together with the ignition system of an automobile is locked simultaneously by the use of a single key, so that an unauthorized person with intent to steal is prevented from starting the motor or from guiding the vehicle should it be possible to move the same.

Another object of the invention is to provide a locking device of the type mentioned which is easily applied to a suitable portion of an automobile, the same being simple in construction, cheap of manufacture and highly efficient for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a sectional plan view of my invention showing the parts in unlocked positions in dotted lines.

Figure 2 is a transverse sectional view on the line 2—2 of Figure 1.

Figure 3 is a similar view on the line 3—3 of Figure 1.

I am aware that various forms of locking devices have been placed on the market for preventing theft of motor vehicles by unauthorized persons, but my device provides a means for locking the ignition system leading to the motor whereby it is impossible to start the same, and at the same time simultaneously lock the steering wheel for preventing the guiding of the vehicle.

Referring more particularly to the drawing, the reference numeral 10 designates the steering post of a motor vehicle which is usually circular in cross section and which passes through a casing or housing 11 enclosing a suitable mechanism about to be described. The housing 11 may be secured to any suitable portion of an automobile but preferably to the instrument board where the usual ignition switch 12 is located. The switch 12 is in the nature of a pin lock 13, the construction of which is old in the art, the lock 13 extending into the housing 11 at the opposite end from the steering post 10. It will be understood that by inserting a key into the key hole of a lock and by imparting a turning movement of the same in one direction closes the switch and by turning in the opposite direction will open the same. It is with these turning movements that the steering wheel lock about to be described is operated to a locked or unlocked position.

The steering post 10 has keyed thereon a squared member 14 for co-action with the jaws 15 of a U-shaped bolt 16. The bolt 16 is mounted in suitable guides 17 secured to a wall of the casing 11 for sliding movement therein. A link 18 has pivotal connection with the bolt 16 as at 19 and with a lever 20 as at 21, which lever is in turn keyed to the rotatable barrel 22 of the lock 13. It will be seen with reference to Figure 1 that when the lock switch is turned to the position shown in dotted lines, the switch is on and the bolt 16 is retracted so as to be free of the squared member 14 thereby permitting free turning movement of the steering posts. When the lock switch is turned to the full line position, the jaws 15 co-act with the flat surfaces on the member 14 whereby turning movement of the post is prevented.

From the foregoing description, it will be manifest that I have shown and described a lock which acts to doubly prevent the theft of a motor vehicle by an unauthorized person, and wherein both of the locking means are operated simultaneously.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a device of the class described, the combination with a steering post of an automobile, a squared member formed thereon, a bolt having jaws, and a key control means for moving said jaws into and out of co-action with said squared member, said means comprising a lock switch and a link connecting said bolt with said lock switch.

2. A locking device including a steering post, a lock switch, a squared surface carried by said steering post, a housing, a U-shaped bolt mounted for sliding movement within said housing, and a link connecting said bolt with said lock switch whereby turning movement of said lock switch in one direction will cause said U-shaped bolt to co-act with the squared surfaces on said steering post, and movement in an opposite direction will cause the retraction of said bolt.

In testimony whereof I have affixed my signature.

EMILE COMEAU.